(12) United States Patent
Volk

(10) Patent No.: US 6,764,434 B1
(45) Date of Patent: Jul. 20, 2004

(54) MULTI-STATION MACHINING CENTER

(76) Inventor: Wilhelm Volk, P.O. Box 452, Franklinton, NC (US) 27525

( * ) Notice: Subject to any disclaimer, the term of this patent is extended or adjusted under 35 U.S.C. 154(b) by 0 days.

(21) Appl. No.: 10/150,551

(22) Filed: May 16, 2002

(51) Int. Cl.[7] ............................................. B23Q 3/157
(52) U.S. Cl. ........................... 483/36; 483/31; 269/21; 269/37; 269/43; 269/45; 409/158; 409/192; 408/34; 144/48.1
(58) Field of Search ............................. 483/14, 15, 30, 483/36, 31; 29/563, 338; 269/21, 216, 37, 43, 45; 144/48.1; 409/202, 212, 158, 192, 203, 213, 217; 408/34, 43, 44

(56) References Cited

U.S. PATENT DOCUMENTS

| | | | |
|---|---|---|---|
| 4,523,617 A | | 6/1985 | Tiedemann |
| 4,673,011 A | | 6/1987 | Lapeyre et al. |
| 4,984,351 A | * | 1/1991 | Matsuyama et al. ......... 29/33 P |
| 4,999,895 A | * | 3/1991 | Hirose et al. ................ 29/33 P |
| 5,094,282 A | * | 3/1992 | Suzuki et al. .............. 144/48.1 |
| 5,107,910 A | * | 4/1992 | Sasaki ....................... 144/48.1 |
| 5,203,389 A | | 4/1993 | Goodwin |
| 5,323,821 A | * | 6/1994 | Suzuki ....................... 144/48.1 |
| 5,407,415 A | * | 4/1995 | Spishak ........................ 29/563 |
| 5,429,461 A | * | 7/1995 | Mukherjee et al. ......... 29/33 P |
| 5,468,101 A | * | 11/1995 | Shoda ......................... 409/202 |
| 5,641,321 A | | 6/1997 | Suzuki |
| 5,653,273 A | | 8/1997 | Bach |
| 5,897,275 A | * | 4/1999 | Sella ............................. 483/14 |
| 6,068,543 A | | 5/2000 | Renn |
| 6,488,060 B1 | * | 12/2002 | Giovanni ..................... 269/21 |

FOREIGN PATENT DOCUMENTS

JP          61-265234 A    * 11/1986

OTHER PUBLICATIONS

Grotefeld, *Winkelkopfe Tastspindein Antriebs–Adapter fur Holz Kinststoff. Leichtmetall.*

* cited by examiner

Primary Examiner—Erica Cadugan
(74) Attorney, Agent, or Firm—Standley Law Group LLP

(57) ABSTRACT

A machining center comprising at least two workstations. A first workstation is adapted to receive a first workpiece, and a second workstation is adapted to receive a second workpiece. The first workstation may be a vacuum table, and the second workstation may be comprised of a plurality of hold-down bars. A carriage is adapted to travel between the two workstations in one machine cycle. The carriage may have a single tool or a plurality of tools. During the machine cycle, the carriage is adapted to perform a machining operation (e.g., routing, drilling, sawing, and/or sanding) on the workpiece at each workstation.

20 Claims, 7 Drawing Sheets

MULTI-STATION MACHINING CENTER

BACKGROUND AND SUMMARY OF THE INVENTION

The present invention relates generally to an automated workbench and, more particularly, to a multi-station machining center. Machining centers may be used to shape products from any of a variety of materials. For instance, machining centers may be fitted with suitable tools for shaping materials like wood, medium density fiber board, aluminum, and plastics. Examples of products that may be made using machining centers include, but are not limited to, doors, windows, and furniture.

A typical machining center includes a single workstation that is adapted to receive a workpiece. The machining center is equipped with a tool that is adapted to perform an operation such as routing, drilling, or sawing the workpiece. After the operation is completed, the machine cycle is over, and the machined workpiece is removed from the workstation. The operator must then load another workpiece on the workstation prior to restarting the machine cycle.

One example of a workstation is a table. Another example of a workstation is one that includes a plurality of hold-down bars that can be configured to match the shape and size of a workpiece. The suitability of a workstation for a job depends on the size and shape of the workpiece and the type of machining operation to be performed. As is known in the art, certain workstations are not desirable or suitable for some sizes and shapes of workpieces or for some types of machining operations.

To compound this problem, some finished products are comprised of components that need to be machined on different types of workstations. For example, a raised panel door typically requires two different machining centers in order to make the various components. To make a raised panel door, a table-type machining center is commonly used to cut, tenon, drill, and route the main door panel, whereas another machining center comprising a plurality of holding bars is commonly used to mill and tenon the stiles and rails for the door. Similar to the process of making a raised panel door, two different types of machining centers are typically used to make the various components of a shaker-type door. The manufacture of many different other products also require multiple machining centers. Thus, due to the limitations of current machining centers, manufacturers typically have at least one table-type machining center and at least one machining center comprised of a plurality of holding bars.

In light of the aforementioned shortcomings of known machining centers, a need exists for a machining center comprising at least two workstations, wherein the machining center is adapted to perform a different machining operation at the respective workstations in one machine cycle. A need also exists for a machining center that includes a table-type workstation and a workstation comprising a plurality of hold-down bars. Another need exists for a machining center that maintains the functionality of a table-type workstation and a workstation comprising a plurality of hold-down bars while decreasing the cost and the space requirements of the two machines. Finally, a need exists for an improved method for manufacturing various types of products.

The present invention satisfies some or all of these needs. An exemplary embodiment of the present invention is a machine comprising at least two workstations. A first workstation is adapted to receive a first workpiece, and a second workstation is adapted to receive a second workpiece. In an exemplary embodiment, the first workstation may be a vacuum table, and the second workstation may be comprised of a plurality of hold-down bars. A carriage is adapted to travel between the two workstations in one machine cycle. The carriage may have a single tool or a plurality of tools. During the machine cycle, the carriage is adapted to perform a machining operation (e.g., routing, drilling, sawing, and/or sanding) on the workpiece at each workstation.

In addition to the novel features and advantages mentioned above, other features and advantages of the present invention will be readily apparent from the following descriptions of the drawings and exemplary embodiments.

DETAILED DESCRIPTION OF EXEMPLARY EMBODIMENT(S)

Figure 1:
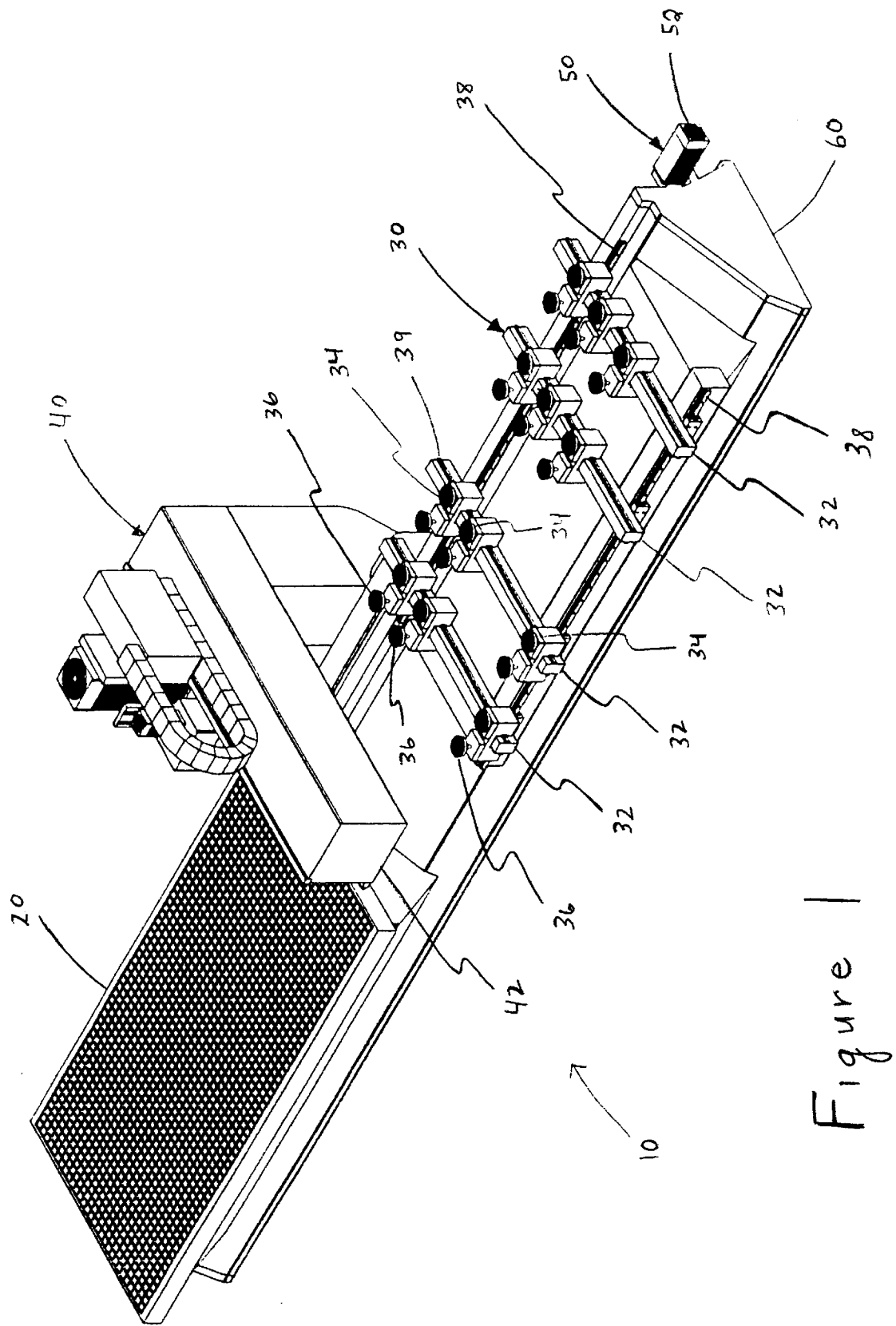
FIG. 1 is a perspective view of an exemplary embodiment of a machine of the present invention. For the purpose of clarity, various electrical wires and tubes are not shown.
Figure 2:
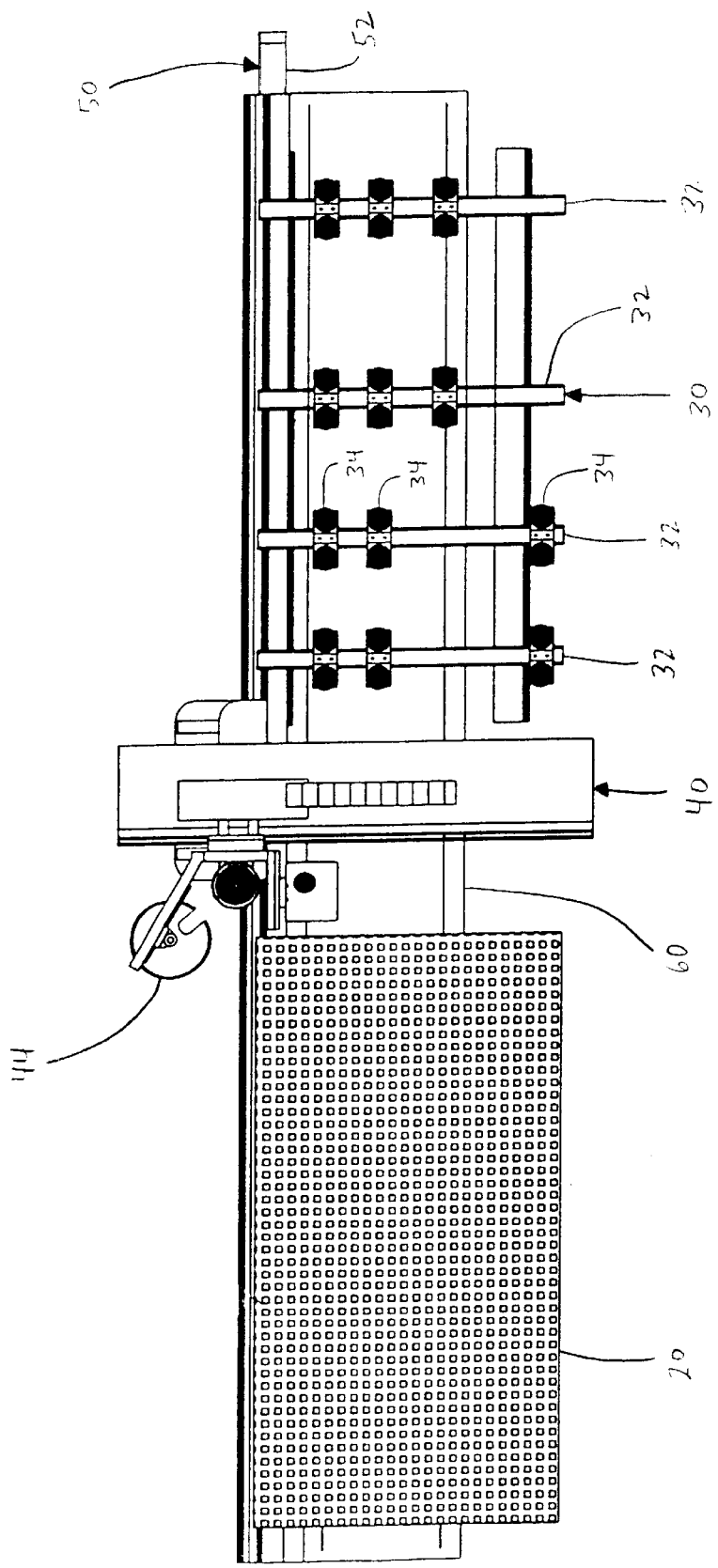
FIG. 2 is a top plan view of the machine shown in FIG. 1.
Figure 3:
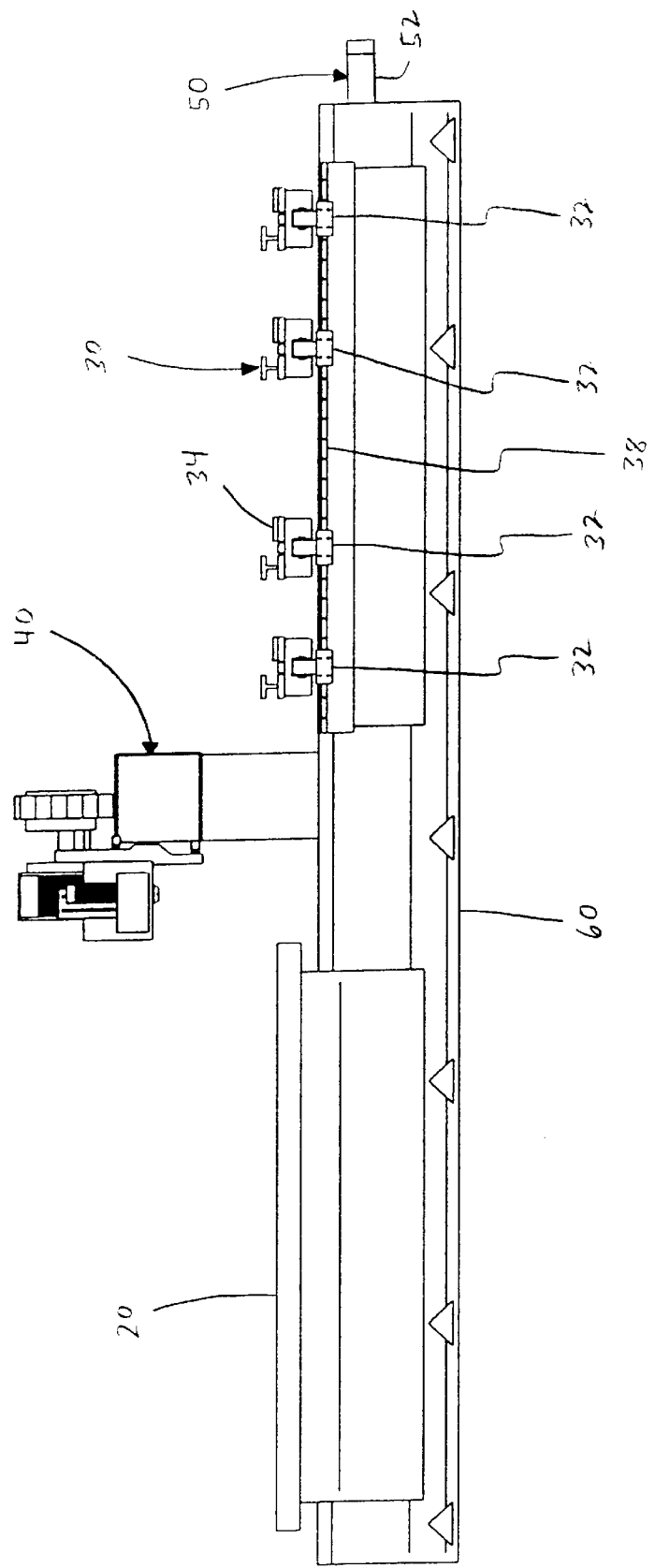
FIG. 3 is a front elevation view of the machine shown in FIG. 1.
Figure 4:
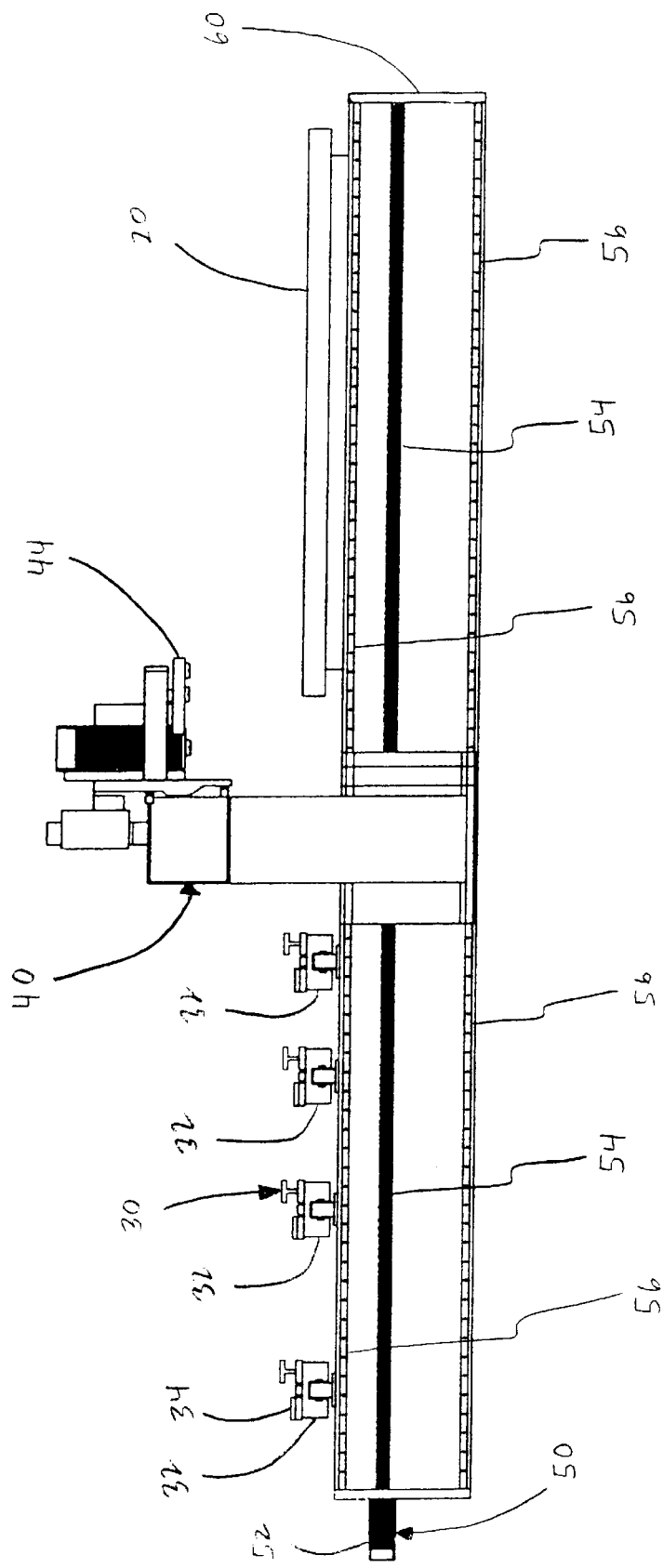
FIG. 4 is a rear elevation view of the machine shown in FIG. 1.
Figure 5:
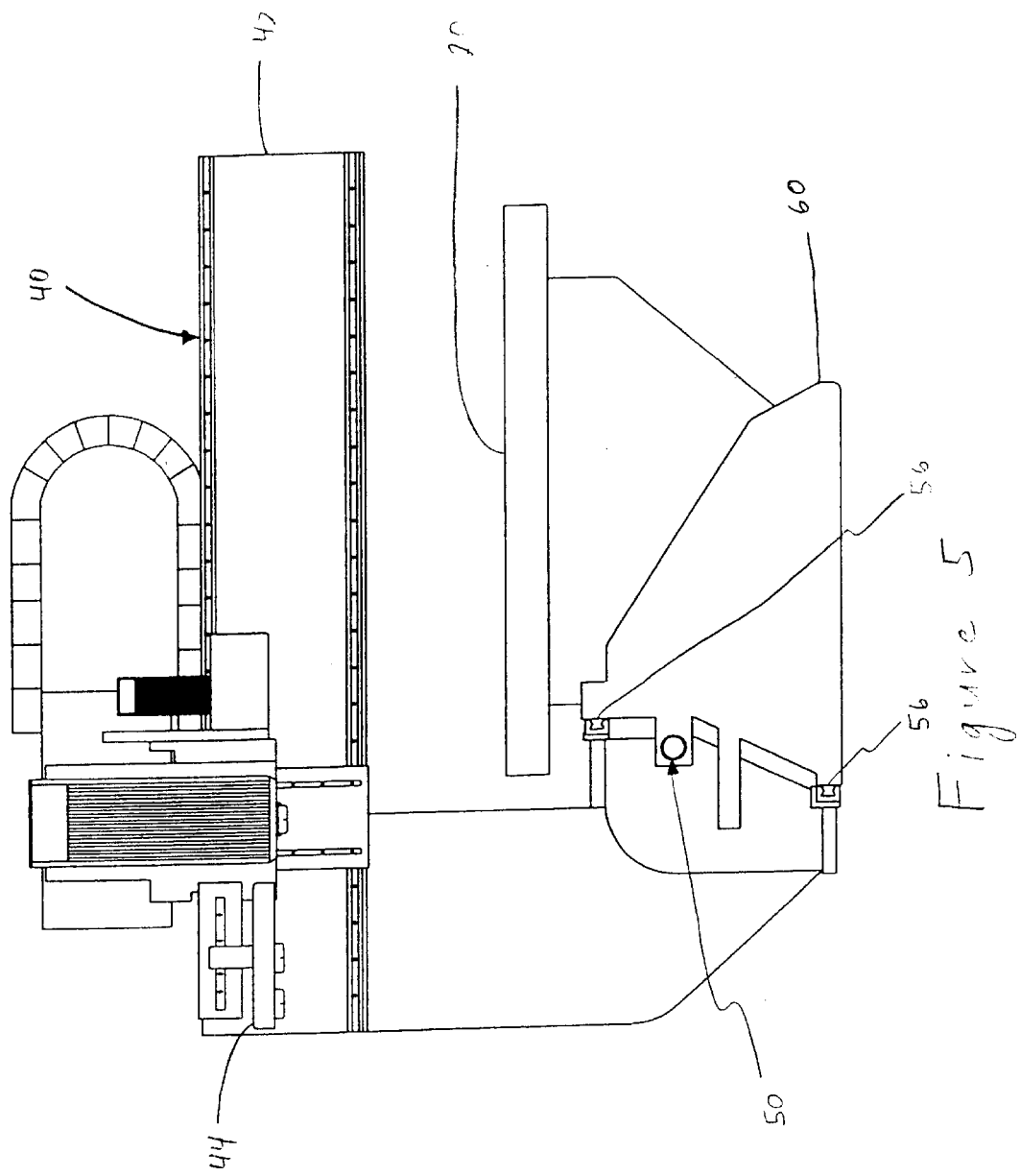
FIG. 5 is a left side elevation view of the machine shown in FIG. 1.
Figure 6:
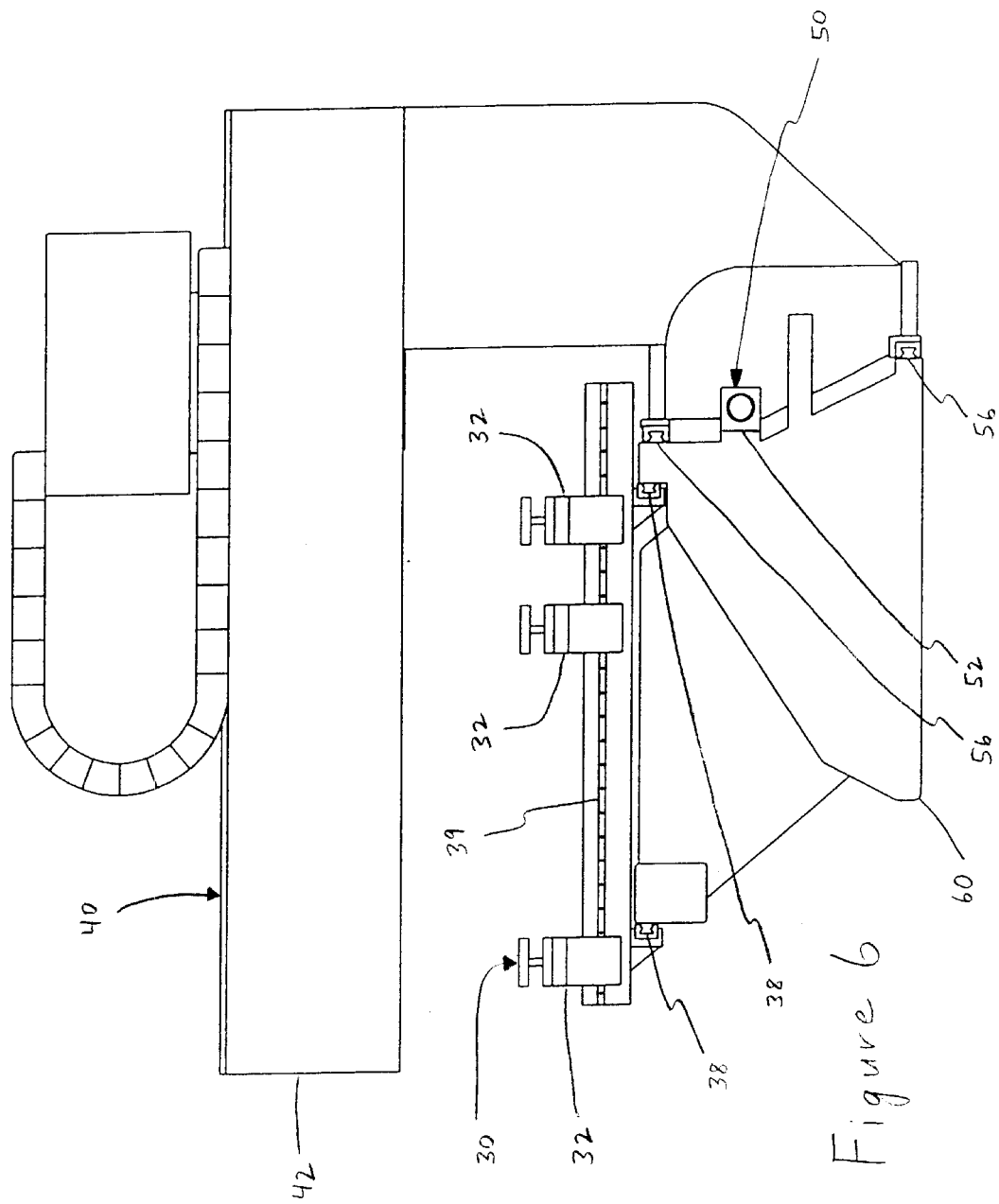
FIG. 6 is a right side elevation view of the machine shown in FIG. 1.

The present invention is directed to a multi-station machine. An exemplary embodiment of the machine may be used to make an endless variety of products. Examples of products that may be made using the machine include, but are not limited to, doors, door frames, window frames, furniture, rails, stiles, spindles, baseboards, deck components, and multiple other products that are commonly made using conventional tools or machining centers. In addition, the machine may make the products from an endless variety of materials including, but not limited to, woods, synthetic woods, particle boards, chipboards, medium density fiber boards, metals, sheet metals, and plastics.

FIGS. 1–6 show an exemplary embodiment of a machine 10 of the present invention. The machine 10 has multiple workstations. In this embodiment, the machine 10 has a first workstation 20 and a second workstation 30. In other embodiments, the machine 10 may include more than two workstations. A carriage 40 is adapted to move between the workstation 20 and the workstation 30. The carriage 40 may be connected to a guide system 50 that is adapted to facilitate the movement between the workstation 20 and the workstation 30. The workstation 20, the workstation 30, and the carriage 40 may be isolated units. However, in this embodiment, the workstation 20, the workstation 30, the carriage 40, and the guide system 50 are secured together by a frame 60.

The workstation 20 and the workstation 30 may be selected from suitable or conventional types of workstations. Furthermore, the workstation 20 and the workstation 30 may be the same type or different types. In the embodiment shown in FIGS. 1–6, the two workstations are different types. Such an arrangement enables the machine 10 to work on a wider variety of components and/or to perform a wider variety of machining operations. However, it should be recognized that it may be desired for the workstations to be of the same type for some machining applications.

In this example, the workstation 20 is a table. In other words, the workstation 20 has a generally planar work surface for receiving a workpiece. The workstation 20 may be similar to the table-type workstations on conventional machining centers. For example, the workstation 20 may be similar to the aluminum worktable on the Record 240 machining center which is made by Routech. For instance, the workstation 20 may be equipped with a vacuum which operates through holes in the work surface. Additionally, the workstation 20 may include other accessories. The work surface may include grooves that facilitate the connection of accessories. For example, rubber hold-down seals may be situated in the grooves to facilitate connecting a workpiece directly to the work surface. Hold-down modules or suction cups may be secured to the workstation 20 to raise the workpiece above the work surface. Pneumatic stops may be used to precisely position the workpiece on the work surface. A jig may also be secured to the workstation 20 to facilitate complex jobs. Furthermore, mechanical clamps may be used to secure a workpiece to the workstation 20. Accordingly, the workstation 20 may be adapted for machining operations that are performed on the top surface or sides of a workpiece. The workstation 20 may also be adapted for machining operations that require the tool to go completely through the workpiece.

The workstation 30 is comprised of at least one hold-down bar 32 in this embodiment. The workstation 30 may be similar to conventional workstations that are comprised of at least one hold-down bar. For example, the workstation 30 may be similar to the flexible TV worktable on the Record 240 TV machining center which is made by Routech. Each hold-down bar 32 may include suitable accessories for securing a workpiece. For instance, each hold-down bar 32 may include at least one suction cup 34. Each suction cup 34 may include an opening connected to a vacuum. Each hold-down bar 32 may also include at least one clamp 36. Each clamp 36 may be a pneumatic clamp. Each hold-down bar 32, suction cup 34, and clamp 36 may be fixed in position or adjustable. In this embodiment, each hold-down bar 32 is adjustable mounted on tracks 38 of the frame 60 with recirculating ball bearings. Similarly, each suction cup 34 and clamp 36 may be adjustable mounted on a respective hold-down bar 32. Each suction cup 34 and each clamp 36 may be independently adjusted. Alternatively, a suction cup 34 may be paired with a clamp 36, wherein the position of each pair may be adjusted. In this example, each pair is adjustable mounted on at least one track 39 of a respective hold-down bar 32. The positions of the hold-down bars 32, the suction cups 34, and the clamps 36 may be manually adjusted. However, in this example, the hold-down bars 32, the suction cups 34, and the clamps 36 are in communication with a control unit. By programming the control unit, the positions of the hold-down bars 32, the suction cups 34, and the clamps 36 may be automatically adjusted to suit a particular workpiece and machining operation.

The carriage 40 is equipped with at least one tool. The tool(s) may be adapted to work on any of a variety of materials including, but not limited to, woods, synthetic woods, particle boards, chipboards, medium density fiber boards, plastics, and metals. In fact, the carriage 40 may be equipped with an endless number of sizes and types of tools not limited to drills, saws, routers, sanders, and other similar tools. Accordingly, the carriage 40 may be equipped with multiple function modules/milling heads including, but not limited to, drilling units, sawing units, routing units, sanding units, and other similar, suitable, or conventional function modules. For example, the carriage 40 may be similar to the tool carriage on the Record 240 machining center or the Record 240 TV machining center, both of which are made by Routech. The tool(s) may be located within a cover 42. The carriage may also include a tool changer 44. The tool changer 44 is adapted to substitute one tool for another tool so that the carriage 40 is properly equipped for the machining operation. The operation of the carriage 40 may be manually or automatically controlled. In this example, the carriage 40 is in communication with a control unit. The control unit may be programmed to control which tool/milling head is being used, the position of each tool/milling head, the movement of each tool/milling head in the X, Y, and Z directions, the operating speed of each tool, and other aspects of the machining operation. Likewise, the control unit may be programmed to control the operation of the tool changer.

As previously noted, the carriage 40 may be connected to a guide system 50 to direct its movement between the workstation 20 and the workstation 30. The guide system 50 may be separate from or integral with the frame 60. In this example, the guide system 50 is mounted on the frame 60. Examples of a guide system 50 include, but are not limited to, linear drive systems and other similar, suitable, or conventional guide systems. The guide system 50 may be lead screw driven, ball nut driven, or driven by any other similar, suitable, conventional mechanism. In this example, the guide system 50 includes a motor 52 which drives a lead screw 54. The lead screw 54 is movably connected to the carriage 40. The position of the carriage 40 may be dictated by controlling the direction of rotation of the lead screw 54 via the motor 52. The motor 52 may be in communication with a control unit that is programmed to precisely control the movement and positioning of the carriage 40. In order to promote maximum rigidity, smooth operation, and limited vibration, the carriage 40 may also be movably connected to the frame 60 on at least one track 56. In this example, the carriage 40 is adapted to run on recirculating ball bearings along the tracks 56.

Figure 7:
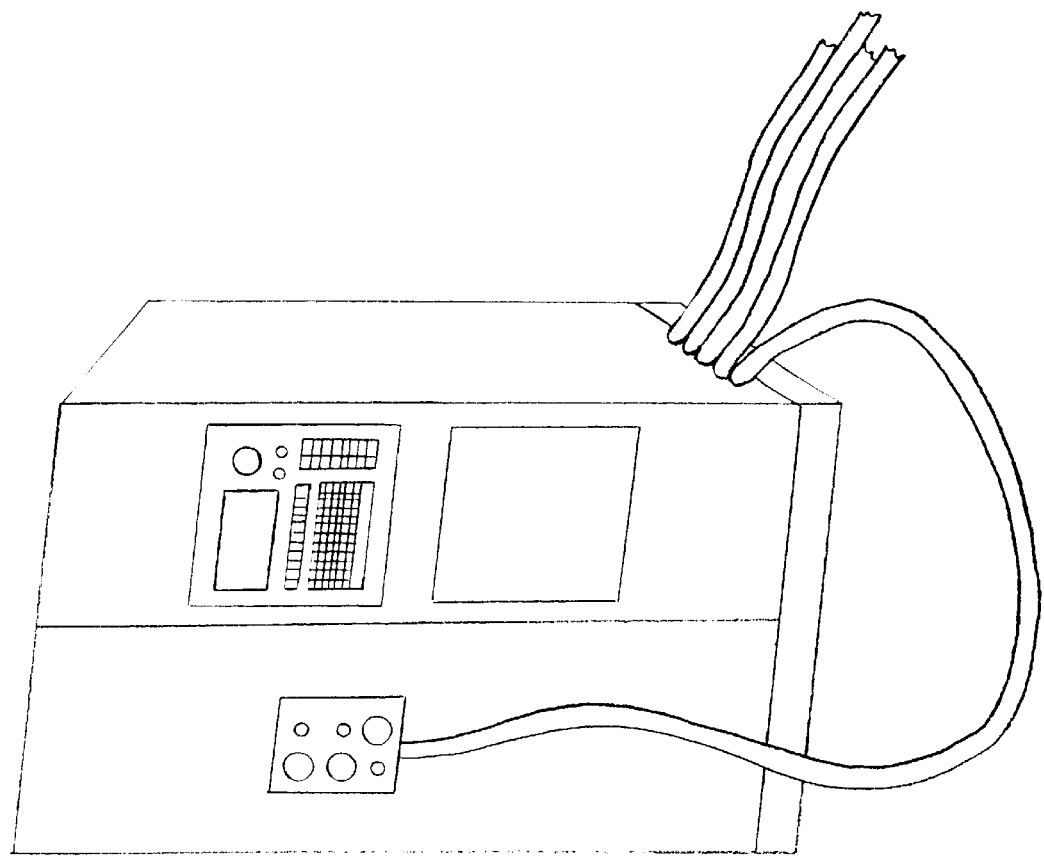
FIG. 7 is a perspective view of an exemplary embodiment of a control unit of the present invention.

FIG. 7 shows an example of a control unit 70. As previously mentioned, the machine 10 may be in communication with the control unit 70. The control unit 70 may be similar to control units used with conventional machining centers. For instance, the control unit 70 may be similar to the control unit which is adapted for use with the Record 240 and Record 240 TV machining centers, both of which are made by Routech. The control unit 70 may have computer numeric control (CNC). The control unit 70 may be programmed to control the operation of the machine 10. For example, the control unit 70 may be programmed to control features including, but not limited to: 1) the movement and positioning of the hold-down bars 32; 2)the movement and positioning of the suction cups 34; 3)the movement and positioning of the clamps 36; 4) the movement and positioning of the carriage 40; 5) the movement, positioning, and operation of the tools; 6) the vacuum power to the workstation 20 and the workstation 30; 7) the operation of any pneumatic accessories; and 8) the operation of the guide system 50.

An exemplary use and operation of the machine 10 will now be described. The machine 10 may be used to make the various components of a raised panel or shaker-type door. A sheet of material or a panel may be secured on the workstation 20. Either before, during, or after the machining operation at the work station 20, one or more components may be secured to the workstation 30. The control unit 70 may be programmed to control the machining operations at the workstation 20 and the workstation 30. The machine operations may begin at the workstation 20 or the workstation 30. At the workstation 20, the carriage 40 may cut numerous components from the sheet of material/panel. This is referred to as nesting. Alternatively, the carriage 40 may cut, drill, route, and sand the sheet of material/panel for use as a finished component. The carriage then travels to the workstation 30 and begins the machining operation on the component(s) secured there. In this example, the machining operation on the component(s) at the workstation 30 may include cutting, drilling for dowel pinholes, routing, dovetailing, milling, and making tenons. For instance, the machining operation at th e workstation 30 may be used to make the door frame as well as the rails or raised panels for a door. While the machining operation is being performed at workstation 30, the sheet of material/panel (or the components cut therefrom) may be removed from the workstation 20, and an other sheet of material/panel may be secured on the workstation 20. After completing the machining operation at the workstation 30, the carriage 40 may return to the workstation 20 and perform another machining operation. Mean while, the machined components may be removed from the workstation 30, and more components may be loaded on the workstation 30. The carriage 40 may perform another machining operation at the workstation 30 after completing the machining operation at the workstation 20. This machine cycle may continue indefinitely. However, it should be recognized that a machine cycle may also be limited to a single machining operation at the workstation 20 and a single machining operation at the workstation 30. In view of the aforementioned features of the machine 10, all of the components of a doorframe and a raised panel or shaker-type door may be manufactured during one machine cycle without changing any templates.

In summary, an exemplary machine of the present invention may provide many advantages over conventional machining centers. For example, the present invention maintains the functionality of multiple workstations while eliminating the need for multiple carriages. As a result, the present invention may eliminate the cost and space requirements of having multiple conventional machining centers. Furthermore, the present invention may increase the efficiency of the manufacturing process. A carriage of the present invention, in one machine cycle, may perform a first machining operation on a workpiece at a first workstation and then travel to a second workstation to perform a second machining operation on a second workpiece. The first workstation may be of a different type than the second workstation, and the tool used to perform the second machining operation may different than the tool used to perform the first machining operation. As a result, all of the components of a finished product may be produced by a machine of the present invention in one machine cycle.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A machine comprising:
   a first stationary workstation adapted to receive a first workpiece;
   a second stationary workstation adapted to receive a second workpiece, said second workstation having a different type of workpiece holder than said first workstation;
   a guide system adapted to facilitate movement between said first workstation and said second workstation; and
   a carriage having a plurality of tools, said carriage connected to said guide system such that said carriage is adapted to move between said first workstation and said second workstation;
   wherein said carriage, in one machine cycle, is automated and adapted to perform an operation on said first workpiece at said first workstation using a first one of said tools and then move to said second workstation to perform an operation on said second workpiece using a second one of said tools.

2. The machine of claim 1 wherein said first workstation is a table.

3. The machine of claim 2 wherein said table includes a vacuum.

4. The machine of claim 1 wherein said second workstation comprises a plurality of hold-down bars.

5. The machine of claim 4 wherein said hold-down bars include at least one clamp.

6. The machine of claim 4 wherein said hold-down bars include at least one suction cup.

7. The machine of claim 1 wherein:
   said first workstation is a vacuum table; and
   said second workstation comprises a plurality of hold-down bars having at least one clamp or at least one suction cup.

8. The machine of claim 1 wherein said guide system is a linear guide system.

9. The machine of claim 1 wherein said carriage includes a tool changer adapted to substitute said second one of said tools for said first one of said tools after completing said operation at said first workstation.

10. The machine of claim 1 wherein said first one and said second one of said tools are adapted to adapted to work on materials selected from the group consisting of woods, synthetic woods, particle boards, chipboards, medium density fiber boards, plastics, and metals.

11. The machine of claim 1 wherein said first one and said second one of said tools are selected from the group consisting of drills, routers, saws, and sanders.

12. The machine of claim 1 further comprising a control unit in communication with said carriage.

13. The machine of claim 12 wherein said control unit has computer numerical control.

14. The machine of claim 1 further comprising:
   a frame;
   wherein said first workstation and said second workstation are secured to said frame.

15. The machine of claim 14 wherein said guide system is secured to said frame.

16. A machine comprising:
   a first stationary workstation comprising a vacuum table adapted to receive a first workpiece;

a second stationary workstation remote from said first workstation, said second workstation comprising a plurality of hold-down bars adapted to receive a second workpiece, said hold-down bars including at least one suction cup or at least one clamp;

a guide system adapted to facilitate movement between said first workstation and said second workstation; and a carriage connected to said guide system such that said carriage is adapted to move between said first workstation and said second workstation;

wherein said carriage, in one machine cycle, is automated and adapted to perform an operation on said first workpiece at said first workstation and then move to said second workstation to perform an operation on said second workpiece.

17. The machine of claim 16 wherein:

said carriage has a plurality of tools;

said carriage is adapted to use a first one of said tools to perform said operation at said first workstation; and said carriage is adapted to use a second one of said tools to perform said operation at said second workstation.

18. The machine of claim 16 further comprising a control unit in communication with said carriage, said control unit having computer numeric control.

19. The machine of claim 16 further comprising a frame securing together said first workstation, said second workstation, and said guide system.

20. A machine comprising:

a first stationary workstation comprising a vacuum table adapted to receive a first workpiece;

a second stationary workstation remote from said first workstation, said second workstation comprising a plurality of hold-down bars adapted to receive a second workpiece, said hold-down bars including at least one suction cup or at least one clamp;

a guide system adapted to facilitate movement between said first workstation and said second workstation;

a carriage having a plurality of tools, said carriage connected to said guide system such that said carriage is adapted to move between said first workstation and said second workstation;

wherein said carriage, in one machine cycle, is automated and adapted to perform an operation on said first workpiece at said first workstation using a first one of said tools and then move to said second workstation to perform an operation on said second workpiece using a second one of said tools.

* * * * *

UNITED STATES PATENT AND TRADEMARK OFFICE
CERTIFICATE OF CORRECTION

PATENT NO. : 6,764,434 B1
DATED : July 20, 2004
INVENTOR(S) : Volk

It is certified that error appears in the above-identified patent and that said Letters Patent is hereby corrected as shown below:

Title page,
Item [56], References Cited, FOREIGN PATENT DOCUMENTS, please add
-- 59-201732 * 11/1984 --.
OTHER PUBLICATIONS, please add -- Routech 240, CNC Working Centres; and Routech 240, CNC Machining Centers. --

Column 3,
Lines 45, 47 and 52, please delete "adjustable" and insert -- adjustably --.

Column 6,
Line 47, please delete "are adapted to adapted to work" and insert -- are adapted to work --.

Signed and Sealed this

Nineteenth Day of October, 2004

JON W. DUDAS
*Director of the United States Patent and Trademark Office*